PULSE-ACTUATED, d-c TO d-c CONVERTER FOR A THERMIONIC DIODE

Filed Oct. 14, 1965 2 Sheets-Sheet 1

INVENTOR,
JOSEPH P. ANGELLO.

BY

ATTORNEY.

April 30, 1968 J. P. ANGELLO 3,381,201

PULSE-ACTUATED, d-c TO d-c CONVERTER FOR A THERMIONIC DIODE

Filed Oct. 14, 1965 2 Sheets-Sheet 2

INVENTOR,
JOSEPH P. ANGELLO.

BY

ATTORNEY.

United States Patent Office 3,381,201
Patented Apr. 30, 1968

3,381,201
PULSE-ACTUATED, D-C TO D-C CONVERTER FOR A THERMIONIC DIODE

Joseph P. Angello, Eatontown, N.J., assignor to the United States of America as represented by the Secretary of the Army Filed Oct. 14, 1965, Ser. No. 496,204
5 Claims. (Cl. 321—2)

ABSTRACT OF THE DISCLOSURE

This disclosure covers low to high voltage D-C converters and describes in particular the connection of a low-voltage, thermionic diode in series with a switch and the primary winding of a step-up transformer. The secondary winding of the transformer is connected to a rectifier and a load. A pulse-generator circuit actuates the switch to disconnect the thermionic diode from the primary winding at regular intervals but reconnects it before the thermionic diode changes from its ignited to its quenched mode of operation.

The invention described herein may be manufactured and used by or for the Government for governmental purposes without the payment of any royalty thereon.

This invention relates to converters and particularly to direct current converters. More particularly this invention relates to a device for converting the low voltage, D-C energy of a thermionic diode into a higher voltage.

The problems of converting a voltage from an available value to a desired value are well known and the most typical situation is that of a low voltage source and a high voltage requirement. Basically, several D-C sources of low voltage can be connected in series, but this is not always practical because of the number of sources that might be required and the size and expense of the resulting structure.

One of the typical, practical systems for converting a low D-C voltage to a higher voltage usually entails chopping, or turning on and off the D-C source of low-voltage, to produce a form of A-C that can be stepped up to a higher voltage, through transformer action, in a well known manner and then rectified to provide D-C at the higher voltage.

A significant factor here is that energy is only being applied by the low-voltage D-C source when it is conducting or during the "on" portion of the A-C cycle. No energy is being applied during the "off" portion of the cycle.

This would suggest the use of a nonsymmetrical waveform with a longer "on" portion of the cycle and a shorter "off" portion of the cycle. However, the problem here is that most of the available sources of direct current, such as batteries, have very specific limitations on the length of time that it takes for the source of current to change from a zero current condition to a maximum current condition or vice versa. This limits the minimum time duration permissible for either the "on" or the "off" portions of the cycle since switching before the maximum condition is reached would decrease efficiency, and, obviously, the longer the maximum current is flowing, the greater the available power output.

This minimum time duration limits the minimum "off" time for any waveform, and ultimately, limits the maximum frequency of operation.

Another very valuable source of low voltage D-C that has similar limitations is the thermionic diode. This can produce a very high current—but only in one of its modes of operation—and it is limited, as is the battery, by the length of time it takes for the diode to switch between modes of operation or from an ignited condition to an extinguished condition. Further, this switching involves reionization for each cycle and the energy of ionization is wasted during each cycle, which further decreases the efficiency of the circuit.

It is therefore an object of this invention to provide an improved system for converting the low-voltage, D-C output of a thermionic diode into a higher voltage.

It is a further object of this invention to provide a direct-current converter, for use with a thermionic diode, that operates with reduced transformer sizes and voltages and with a minimum of parts.

It is a further object of this invention to provide a direct-current converter, for use with a thermionic diode, that will operate at higher frequencies and with higher efficiency.

It is a further object of this invention to provide a direct-current converter, for use with a thermionic diode, that utilizes the maximum current from the diode for a higher percentage of time.

These and other objects are accomplished by connecting a thermionic diode through a transistor switch to a step-up transformer and applying a nonsymmetrical-waveform voltage to control the transistor switch. The "on" portion of the transistor switch cycle may be extended for as long as the transformer can effectively accommodate or utilize the flow of current, but the "off" portion of the transistor switch cycle must be substantially less than the period of time it takes the thermionic diode to go from its ignited mode of operation to its quenched mode. The stepped-up output of this transformer is rectified in a well known manner to provide a high-voltage, D-C output.

This invention will be better understood and further objects of this invention will become apparent from the following specification and the drawings, of which:

Figure 1:
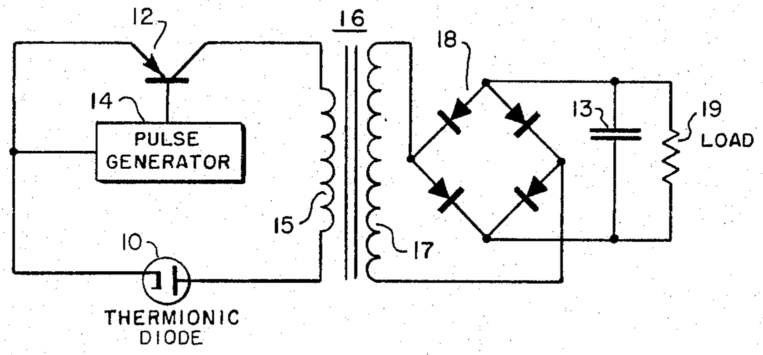
FIG. 1 is a circuit diagram of a typical embodiment of this invention.

Referring now more particularly to FIG. 1 the circuit diagram shows the connection of a thermionic diode 10 through a transistor switch 12 and through the primary winding 15 of the transformer 16. The secondary winding 17 connects through a full-wave, bridge rectifier 18 to the output load 19. The capacitor 13 filters the output of the rectifier 18 in a well-known manner.

Figure 2:
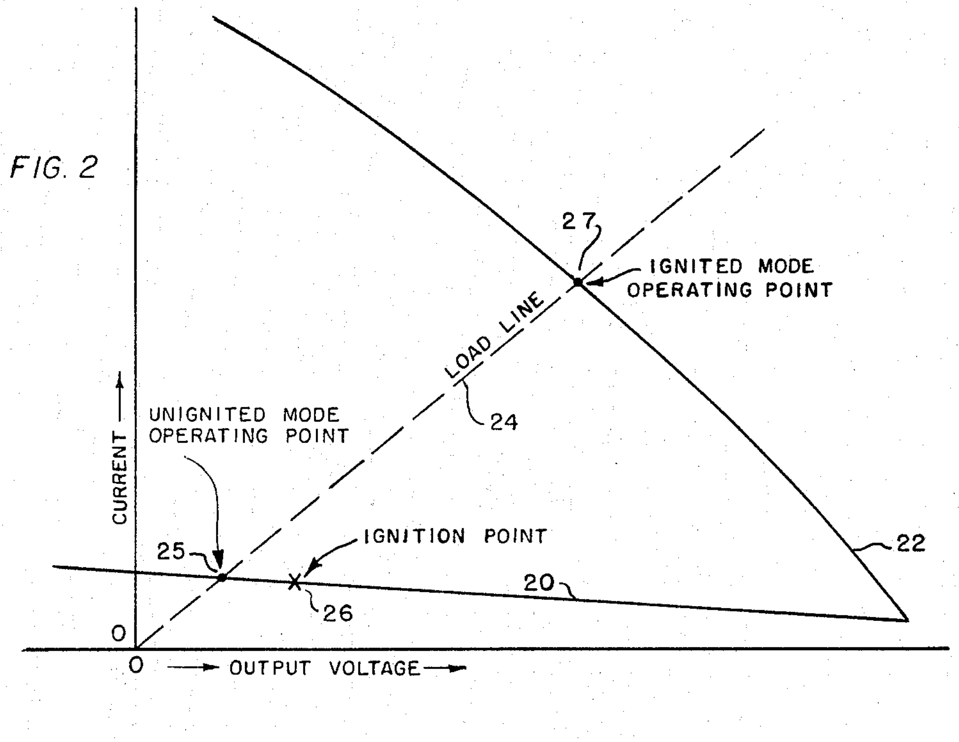
FIG. 2 shows the volt-ampere curve of a thermionic diode.

FIG. 2 shows the bi-stable, operational conditions existing in a cesium vapor type thermionic diode at emitter temperatures of between 1100° and 1400° C. The low current or unignited mode of operation is curve 20 and the high current or ignited mode of operation is curve 22, which is obviously the more efficient. In order to transfer from mode 20 to mode 22 without applying an external voltage, the unignited mode operating point 25, determined by the load impedance—which also establishes the load line 24—must be to the left of the ignition point 26. The location of this ignition point voltage is not fixed, and it can be shifted along the line 20, away from the operating point 25, by optimizing the parameters of the diode for this condition. When this condition exists, the diode 10 of FIG. 1 will be self-triggered into the ignited mode of operation by merely closing a circuit switch.

In operation, current will flow from the diode 10 of FIG. 1 when it is exposed to a source of heat, and the flow of current will be in accordance with the volt-ampere curves shown in FIG. 2. When the transistor 12 is switched on by the pulse generator 14 this current will flow through the transitor 12 and through the primary 15 of the transformer 16. The switching of the transistor will provide a current between zero in the "off" condition and that of the operating point 27 on the ignited-mode curve in the "on" condition.

Figure 3:
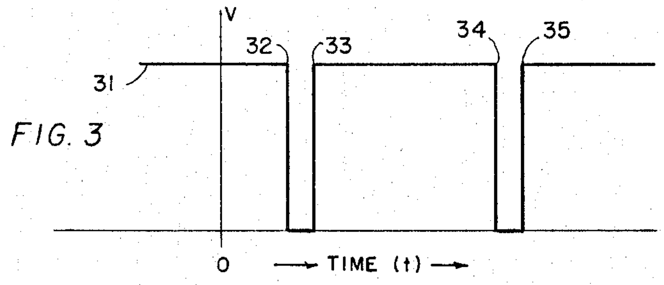
FIG. 3 shows the nonsymmetrical, switching waveform.

FIG. 3 shows a typical voltage waveform that can be applied to the transistor by the pulse generator 14. With the transistor initially in an "on" condition at 31 it will be switched off at 32, switched on again at 33, switched off again at 34, and switched on again at 35, etc. In the operation of the circuit as described here the "off" time of the transistor switch between 32 and 33 will normally be a very small fraction of the "on" time between 33 and 34. The operation of this current and the critical nature of the switching times that are necessary in order to achieve the results in accordance with the teachings of this invention, are seen in the following waveforms which show the current flow, through the load, with respect to time under various operating conditions.

Figure 4:
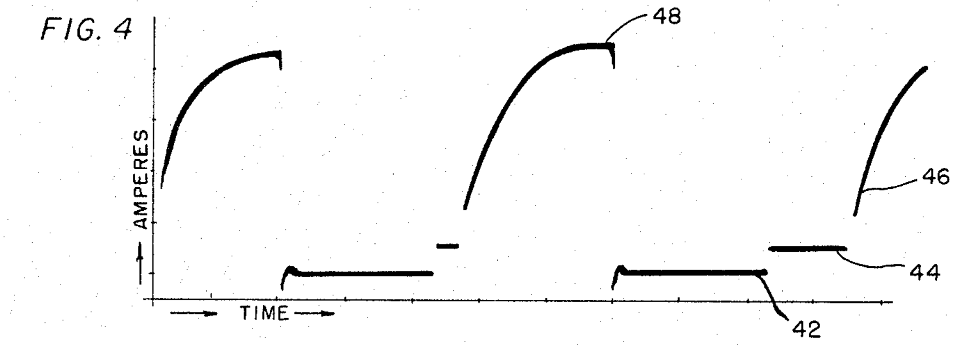
FIGS. 4 through 7 show the waveform of the output current of the thermionic diode at various frequencies and switching times.

FIG. 4 shows the waveform of the current flowing in the circuit when the frequency of pulsing is 114 cycles per second and the transistor is conducting for about 50 percent of the cycle time. Under these conditions of operation, three currents are apparent during one cycle, the zero current or open circuit condition current 42, the unignited mode condition current 44 and the ignited mode condition current which includes the rise 46 in the current to the maximum, operating level 48. This shows that the normal type of operation is not only unstable, as seen in the erratic shape of the current pulses in successive cycles, but that the average output current per cycle is relatively low, as seen in the small percentage of time that any significant current is flowing.

Figure 5:
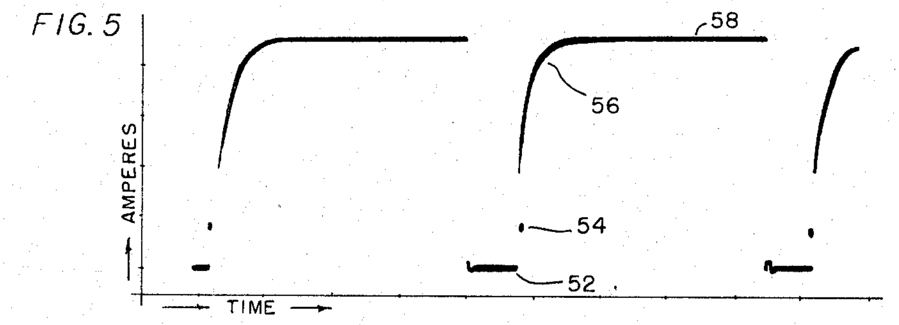

FIG. 5 shows the current waveform of the same circuit operating again at a frequency of 114 cycles per second, but in this case the transistor is conducting for about 80 percent of the cycle time. In this graph the zero or open circuit condition current is 52; the unignited mode condition current is 54; and the ignited mode condition current 56 rises to the peak value 58.

While the firing time is now fairly stable in each cycle, the switching time from zero to maximum current is still substantial, and still includes a noticeable portion of time of operation in the unignited mode 54. Also, while a large percentage of "on" time is realized, the circuit is on, almost in a D-C condition for a longer time than is desirable for use with available transformers.

The emitter temperature and interelectrode spacing were maintained at a constant value in all of these tests, but in this case, the cesium reservoir and collector temperatures were adjusted to obtain the optimum waveforms shown here.

Figure 6:
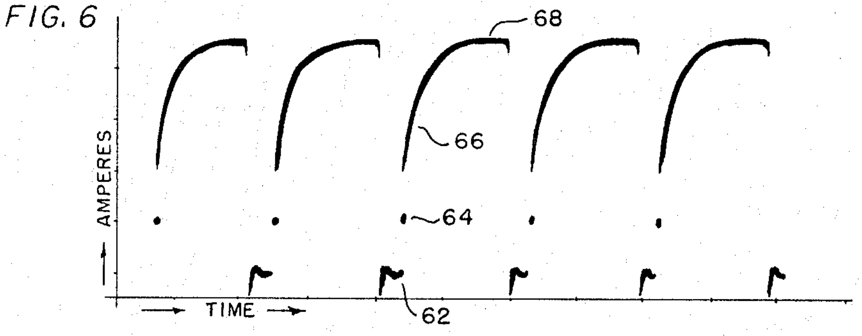

FIG. 6 shows the current waveform of the circuit optimized for a frequency of 532 cycles per second, while the transistor is, again, conducting for about 80 percent of the cycle time. However, while the switching "off" time is only a small portion of the "on" time, the rise time 66 between the open circuit, or zero-current condition 62 and the peak current 68 becomes significant. This time again includes a noticeable transient time 64 of unignited mode operation. The resultant average output current per cycle is now low compared to the average current at lower frequency value.

Figure 7:
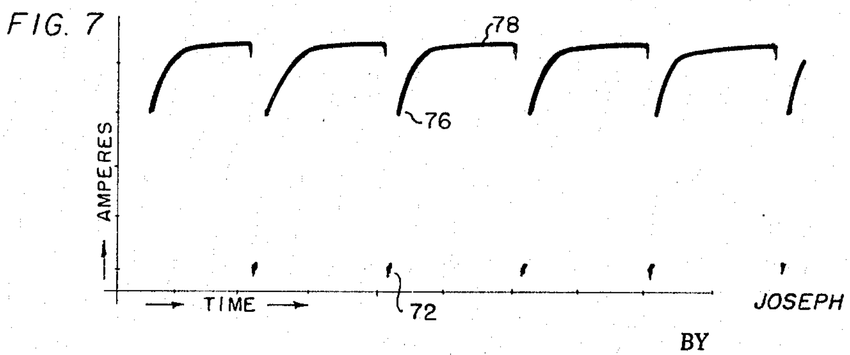

FIG. 7 shows the current waveform, again at 532 cycles per second but with the transistor conducting time increased to about 94% of the cycle time. Here, the unignited mode current, equivalent to 64 in the other samples, does not appear and the switching 76 from the zero current condition 72 to the maximum condition 78 is very much faster, and the interval of time as maximum current is substantially increased with a corresponding increase in the efficiency of operation.

It is clear from the waveforms 6 and 7 that a thermionic diode switched with a non-conducting interval less than the deionization time of the diode can be practical for frequencies in excess of 500 cycles per second.

The times required for quenching or deionization of a thermionic diode, will vary with the parameters of the diodes used, as well as with the variations of the types of diode that are suitable here. These variations are almost infinite and need not be discussed here except to note that the larger the volume of cesium the longer the deionization time and vice versa. The area of the electrodes is not critical. The essential criterion, in any case, is that no significant deionization should take place in the interelectrode space while the transistor is not conducting.

In addition to the higher efficiencies due to the high currents developed over a longer portion of the cycle, the possibility of higher frequencies also allows the design of higher efficiency transformers of reduced size, weight, and cost.

The single-switch, chopper circuit avoids the back voltage of a push-pull circuit and reduces the voltage peaks that the transformer will have to be designed to accommodate. This further simplifies the design.

The parameter of the thermionic diode may be adjusted for maximum power output whenever such adjustments are available. Such adjustments may include control of the interelectrode spacing, as well as control of the temperatures of the cesium reservoir, the emitter electrode, and the collector electrode.

The output load should also be chosen or adjusted to obtain the maximum power output from a given source.

The nonsymmetrical, square-wave, pulse-generating circuit 14 to control the transistor switch can be any of very many, well-known circuits that will produce an output of the waveform of FIG. 3. Any circuit of this nature, that has adequate power output and the correct impedance matching characteristics would be suitable. Such circuits are too well known to require specific description here.

It will also be obvious that more sophisticated circuits may be used with the unsymmetrical waveform output. For example, the transformer core may be provided with some form of core-polarity reversing circuit for more effective operation and efficiency.

While only one thermionic diode is shown here and only one is recommended for greater simplicity, economy, and effectiveness, it is obvious that a plurality of thermionic diodes can be used to increase the available current and to provide a greater output.

In a typical embodiment of this invention the thermionic diode 10 is of the cesium vapor type with 11.7 sq. cm., molybdenum-emitter and nickel-collector, planar electrodes. The emitter temperature is about 1300° C., the collector temperature is about 500° C., the cesium temperature is about 340° C., and the interelectrode spacing is 13 mils.

The transistor 12 is of the type 2N174 manufactured by Delco.

A toroidal core transformer with a turns ratio of 2:3 is used with JAN IN4245 diodes in the bridge rectifier 18.

What is claimed is:

1. A low voltage to high voltage converter comprising a thermionic diode having a given deionization time; a switch; means for converting a low voltage, chopped waveform to a higher voltage connected in series with said thermionic diode and said switch; and an unsymmetrical waveform generator connected to said switch, to turn said switch off and on, the time between said off and on switching functions being substantially less than said deionization time.

2. A converter as in claim 1 wherein said switch comprises a transistor.

3. A converter as in claim 1 wherein said means for converting a low voltage, chopped waveform to a higher voltage, comprises a transformer having a primary winding and a secondary winding, said primary winding being connected in series with said thermionic diode and said switch, and load means connected to said secondary winding of said transformer.

4. A converter as in claim 3 wherein said load means comprises a diode and an output load connected in series with said secondary winding of said transformer.

5. A D-C to D-C converter comprising a cesium-vapor, thermionic diode having an emitter electrode at a temperature of about 1400° C., a collector electrode at a temperature of about 500° C., cesium vapor temperature of about 340° C., a spacing between said electrodes of about 13 mils, and a given deionization time; a switching transistor having an input circuit and an output circuit; a transformer having a primary winding and a secondary winding, said primary winding connected in series with said thermionic diode and said output circuit of said transistor; an unsymmetrical waveform generator connected to said input circuit of said transistor; a rectifier and an output load connected in series with said secondary winding of said transformer, said unsymmetrical waveform generator switching said transistor off and on in a time interval substantially less than said given deionization time of said thermionic diode.

References Cited

UNITED STATES PATENTS

| | | | |
|---|---|---|---|
| 3,146,388 | 8/1964 | Rasor | 310—4 X |
| 3,196,295 | 7/1965 | Oppen et al. | 310—4 |
| 3,273,048 | 9/1966 | Hoff et al. | 322—2 |
| 3,329,885 | 7/1967 | Gabor et al. | 310—4 X |

JOHN F. COUCH, *Primary Examiner.*

W. H. BEHA, *Assistant Examiner.*